(12) United States Patent
Yamashita et al.

(10) Patent No.: US 7,298,561 B1
(45) Date of Patent: Nov. 20, 2007

(54) OPTICAL DEVICE

(75) Inventors: Tatsumaro Yamashita, Miyagi-ken (JP); Eiki Matsuo, Nagano-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/680,950

(22) Filed: Mar. 1, 2007

(30) Foreign Application Priority Data
Mar. 2, 2006 (JP) .............................. 2006-056312

(51) Int. Cl.
*G02B 13/18* (2006.01)
*G02B 9/04* (2006.01)

(52) U.S. Cl. ...................... 359/717; 359/740; 359/793; 359/756; 359/761; 359/762; 359/649

(58) Field of Classification Search ................ 359/717, 359/740, 793, 756, 761, 762, 649–651
See application file for complete search history.

(56) References Cited

U.S. PATENT DOCUMENTS

| | | | | |
|---|---|---|---|---|
| 3,874,770 A | * | 4/1975 | Shimizu ..................... | 359/761 |
| 5,434,713 A | * | 7/1995 | Sato ........................... | 359/762 |
| 5,579,169 A | * | 11/1996 | Mouri ........................ | 359/762 |
| 5,861,999 A | * | 1/1999 | Tada .......................... | 359/752 |
| 6,084,719 A | * | 7/2000 | Sugawara et al. ......... | 359/651 |
| 2003/0197954 A1 | * | 10/2003 | Ikeda et al. ................ | 359/726 |
| 2004/0130799 A1 | * | 7/2004 | Kreitzer .................... | 359/651 |
| 2005/0174463 A1 | * | 8/2005 | Ohzawa et al. ............ | 348/335 |

FOREIGN PATENT DOCUMENTS

| | | |
|---|---|---|
| JP | 04-068307 | 3/1992 |
| JP | 4-68307 | 3/1992 |
| JP | 2002-072085 | 3/2002 |
| JP | 2003-232998 | 8/2003 |
| JP | 2003-307674 | 10/2003 |
| JP | 2005-221920 | 8/2005 |

OTHER PUBLICATIONS

Office Action for corresponding European Patent Application Ser. No. EP 07003435.0.

* cited by examiner

*Primary Examiner*—Evelyn A. Lester
(74) *Attorney, Agent, or Firm*—Brinks Hofer Gilson & Lione

(57) ABSTRACT

A front group is formed of a negative first lens as a meniscus lens which is convex at the object side and a negative second lens, and a rear group is formed of a biconvex positive third lens, an aperture stop, a negative fourth lens and a biconvex positive fifth lens. The first lens is a glass lens, and the second lens is a plastic aspherical lens. The following conditions are satisfied: $-2.4 < fI/f < -1.55$, $0.15 < f2/f1 < 0.35$, $va < 29$, and $vb > 50$, where f denotes a focal distance of a whole system, f1 denotes a focal distance of the first lens, f2 denotes a focal distance of the second lens, fI denotes a focal distance of the front group, va denotes an average value of abbe numbers of the third and the forth lenses, and vb denotes an average value of abbe numbers of the rest of the lenses.

7 Claims, 9 Drawing Sheets

FIG. 4A
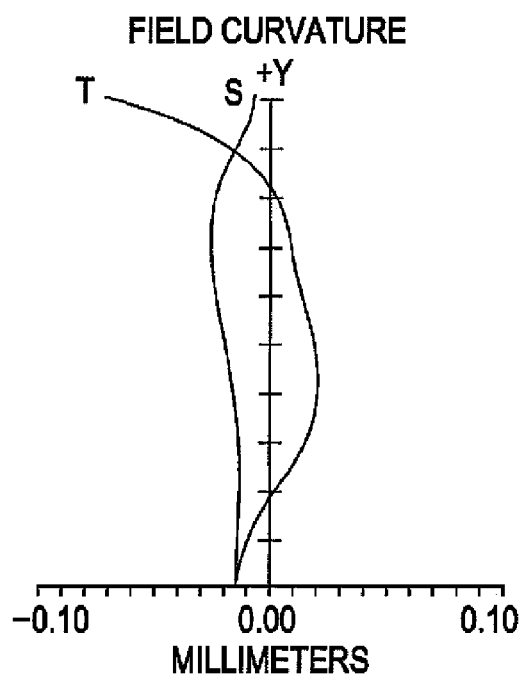
FIG. 4B
FIG. 5A
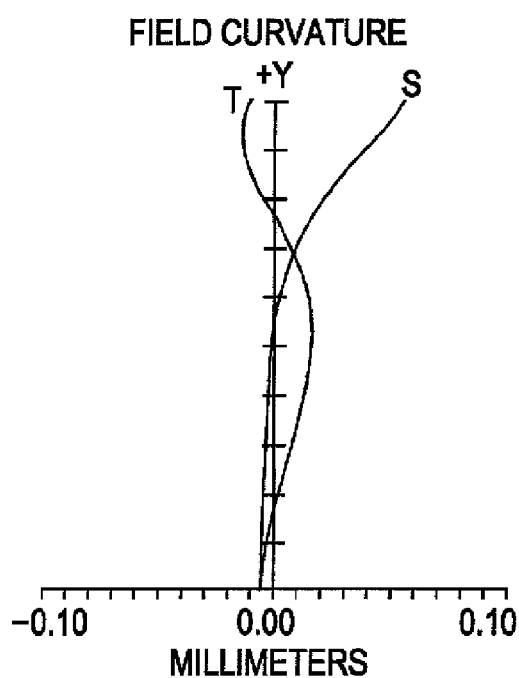
FIG. 5B
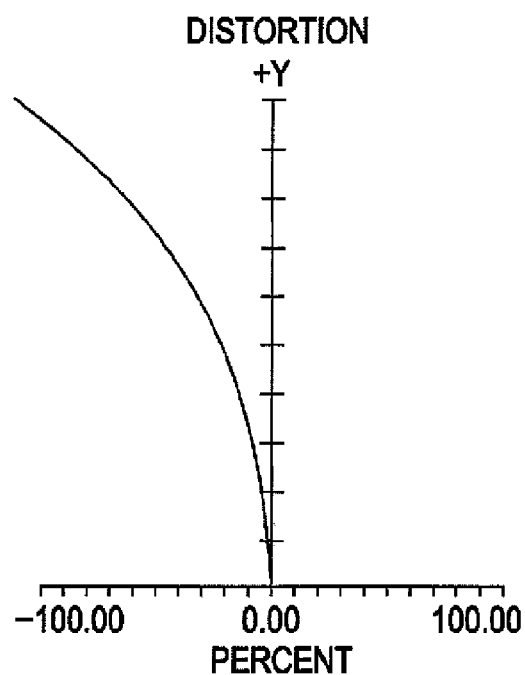
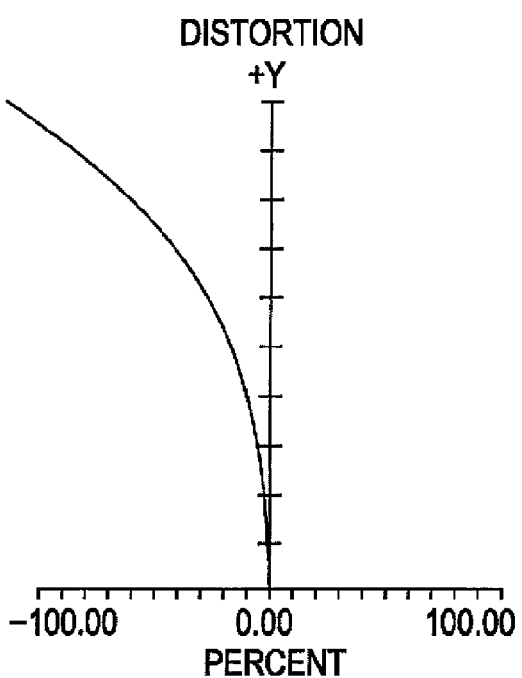

OPTICAL DEVICE

This application claims the benefit of priority under 35 U.S.C. § 119 to Japanese Patent Application No. 2006-056312, filed Mar. 2, 2006, which is hereby incorporated by reference in its entirety.

BACKGROUND OF THE INVENTION

1. Field of the Invention

This invention relates to an optical device used as a super-wide image pickup lens that forms an image of a subject on a light receiving surface.

2. Description of the Related Art

A wide-angle lens that covers a wide field has been generally employed in on-board cameras and/or monitoring cameras. Accompanied with the advanced image processing technology, the super-wide lens capable of covering the wider field by correcting distortion of the image in real time has been increasingly demanded. Optical devices that satisfy requirements, such as compact size, high resolution, and low cost are very desirable, especially in view of the demands relating to the space for accommodating such devices and the required higher resolution of the picture element. Accordingly such devices also have application into other fields.

Specifically, the aforementioned optical system is expected to satisfy the following requirements:

Low cost (reduction in the number of lenses, use of the plastic lens, high moldability, easy assembly);

Brightness (small Fno);

Compact dimensions (overall length, lens diameter);

Wide field (wide field angle in excess of 180° depending on the application);

High resolution (Well corrected basic aberration);

Projection mode in need (isometric projection, three-dimensional projection)

Reduction in the number of lenses used for the optical device which satisfies the aforementioned requirements allows such optical device to be applied to various industrial fields.

FIG. 12 is a sectional view of the super-wide lens disclosed in Japanese Unexamined Patent Application Publication No. 4-68307. The super-wide lens including a lens system which covers a wider field angle and includes relatively a small number of lenses is formed of a front group and a rear group. As all the lenses of the lens system are spherical glass lenses, it is difficult to cover the field angle in excess of 90°, and accordingly, it is difficult to realize the projection with a small compression rate around the viewing surface, for example, isometric projection, three-dimensional projection and the like.

FIG. 13 is a sectional view of the super-wide optical system disclosed in Japanese Unexamined Patent Application Publication No. 2005-221920. The super-wide optical system is intended to solve the problem of the optical system as disclosed in Japanese Unexamined Patent Application Publication No. 4-68307 by employing the aspherical lens. It is structured such that the power of the front lens group is relatively stronger (magnification of the rear group is higher). Accordingly, the field angle equal to or smaller than 90° may be covered. If the field angle is intended to be further widened while using the plastic lens, it may increase the focal shift due to the temperature change as well as deteriorate the aberration balance between the front group and the rear group.

FIG. 14 is a sectional view of the super-wide lens as disclosed in Japanese Unexamined Patent Application Publication No. 2003-232998. The structure of the super-wide lens is based on that of Japanese Unexamined Patent Application Publication No. 4-68307 in which the aspherical lens is employed. Contrary to Japanese Unexamined Patent Application Publication No. 2005-221920, as the power of the front group of the super-wide lens is relatively lower, it is not suitable for the wider field angle. In the case where the plastic lens is employed, the focal shift due to the temperature change may be increased.

SUMMARY OF THE INVENTION

Accordingly, the object of the present invention is to provide an optical device which allows a small number of lenses to cover the wide field angle in excess of 180°, and to realize a projection with small compression rate around the viewing surface (isometric projection, three-dimensional projection and the like) by using plastic lens, which can be used as an inexpensive and compact super-wide lens with the small focal shift due to the temperature change.

In the present invention, an optical device includes a front group formed of a plurality of lenses and a rear group formed of a plurality of lenses, which are arranged from an object side. The front group includes a negative first lens as a meniscus lens being convex at the object side, and a negative second lens having a stronger curvature at an image side than that at the object side, which are arranged in order from the object side, where the first lens is a glass lens and the second lens is a plastic aspherical lens. The rear group includes a positive biconvex third lens, an aperture stop, and a composite lens formed by combining a negative fourth lens with stronger curvature at the image side than that at the object side, and a positive biconvex fifth lens in tight contact therewith. Following conditions (C1) and (C2) are satisfied:

$$-2.4 < fl/f < -1.55 \qquad (C1)$$

$$0.115 < f2/fI < 0.35 \qquad (C2)$$

where f denotes a focal distance of a whole system, f1 denotes a focal distance of the first lens, f2 denotes a focal distance of the second lens and fI denotes a focal distance of the front group.

In the present invention, it is preferable to satisfy following conditions (C3) and (C4):

$$va < 29 \qquad (C3)$$

$$vb > 50 \qquad (C4)$$

where va denotes an average value of abbe numbers of the third lens and the fourth lens, and vb denotes an average value of abbe numbers of all the rest of the lenses.

In the present invention, preferably at least one of the lenses of the rear group is a plastic aspherical lens.

In the present invention, it is preferable to satisfy a following condition (C5):

$$-3.4 < f3/fI < -1.4 \qquad (C5)$$

where f3 denotes a focal distance of the third lens.

In the present invention, in the case where the positive sixth lens as the plastic aspherical lens is not added to the image side of the fifth lens of the rear group, it is preferable to satisfy a following condition:

$$-1.6 < f4/fII < -1.1 \qquad (C6)$$

where f4 denotes a focal distance of the fourth lens, and fII denotes a focal distance of the rear group.

In the present invention, a positive sixth lens formed as a plastic aspherical lens may be added to the image side of the fifth lens of the rear group, and a following condition (C7) may be satisfied:

$$4 < f6/f \qquad (C7)$$

where f6 denotes a focal distance of the sixth lens.

In the present invention, in the case where the sixth lens is provided, it is preferable to satisfy a following condition (C8):

$$-1.2 < f4/fII < -0.5 \qquad (C8)$$

where f4 denotes a focal distance of the fourth lens and fII denotes a focal distance of the rear group.

The present invention is structured to allow a small number of lenses to cover the wide field angle in excess of 180°, to realize a projection with small compression rate around the viewing surface (isometric projection, three-dimensional projection and the like) by preferentially using the plastic lens, and to be inexpensive and compact having a the small focal shift due to the temperature change.

BRIEF DESCRIPTION OF THE DRAWINGS

FIGS. 4A and 4B show aberration graphs of the astigmatism and distortion according to the second embodiment;

FIGS. 5A and 5B show aberration graphs of the astigmatism and distortion according to the third embodiment;

DESCRIPTION OF THE PREFERRED EMBODIMENTS

Figure 1:
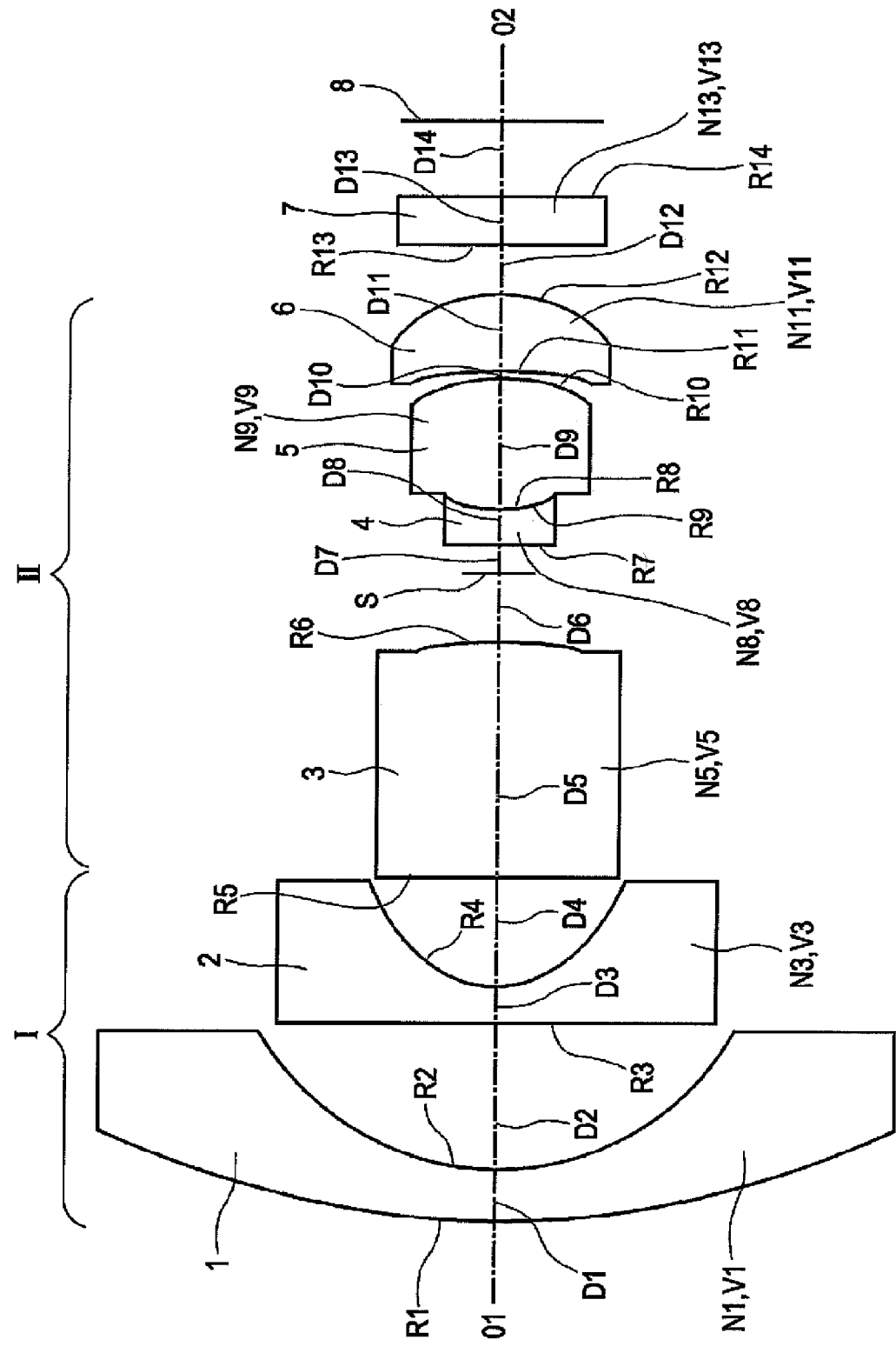
FIG. 1 is a sectional view of an optical device according to a first aspect of the present invention.
Figure 3:
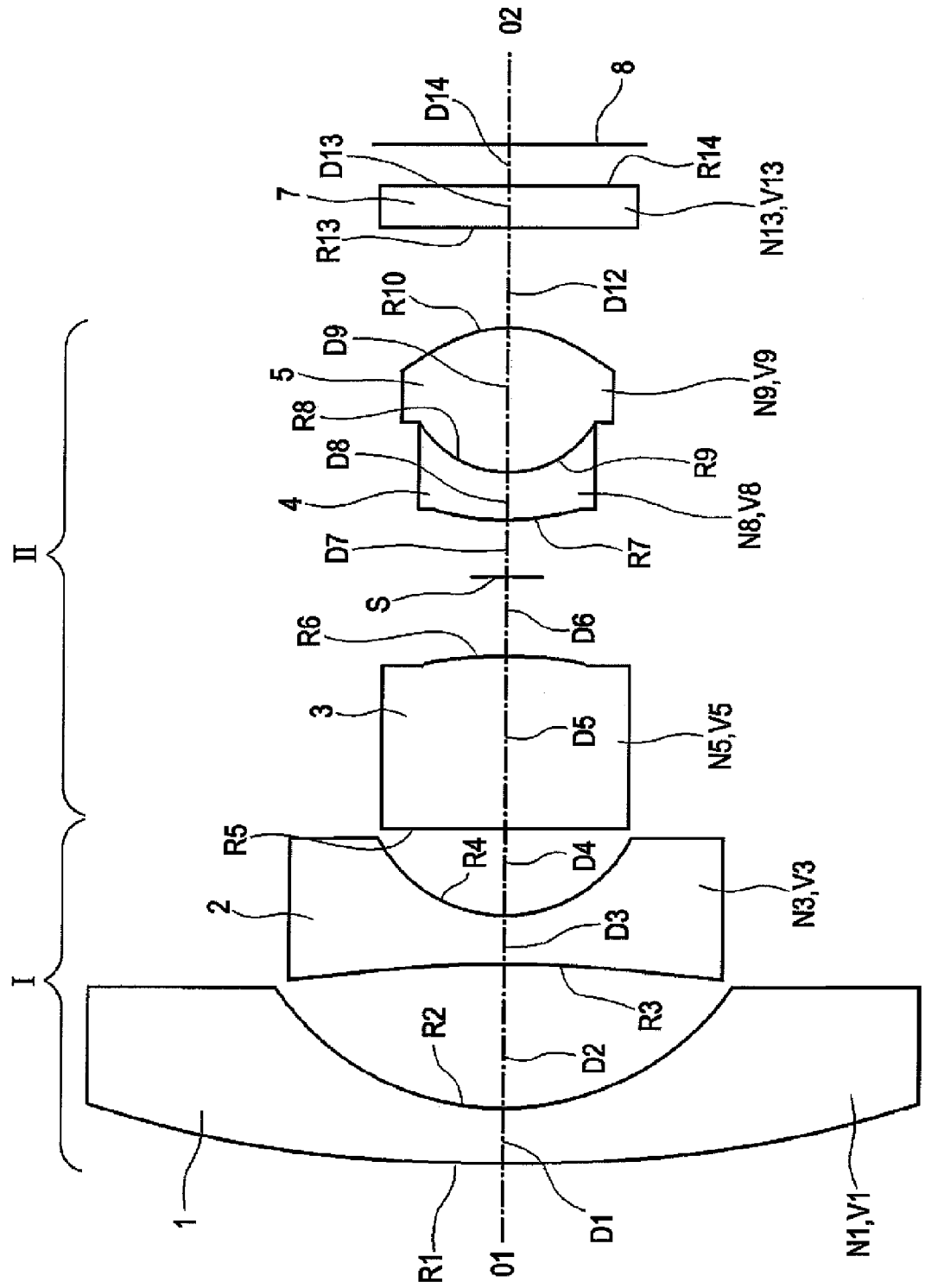
FIG. 3 is a sectional view of an optical device according to a second aspect of the present invention.

FIG. 1 is a sectional view of an optical device according to a first aspect of the present invention. FIG. 3 is a sectional view of an optical device according to a second aspect of the present invention. Each optical device is an image pickup unit equipped with super-wide lens group including a first group I and a second group II, and an image pickup element 8.

Referring to FIGS. 1 and 3, the optical axis of the optical device extends along O1-O2, that is, the O1 indicates an object side, and the O2 indicates an image side.

An optical device according to the first aspect shown in FIG. 1 includes a first group I formed of two lenses and a rear group II formed of a plurality of lenses, which are arranged from the object side. The incident light beam from the object side passes through the respective lenses of the front and the rear groups I and II to form an image on a light receiving surface of the image pickup element 8 at the image side. A cover glass 7, or a lowpass filter may be interposed between the rear group II and the image pickup element 8 as necessary.

The front group I includes a negative first lens 1 as a glass lens in the form of a meniscus lens with its object side convex, and a negative second lens 2 formed of plastic having stronger curvature at the image side (O2 side) than at the object side (O1 side), which are arranged in order from the object side (O1 side). The rear group II includes a biconvex positive third lens 3, an aperture stop S, and a composite lens closer to the image side than the aperture stop S. The composite lens includes a negative fourth lens 4 having a stronger curvature at the image side than at the object side, and a biconvex positive fifth lens 5, which are bonded in tight contact. The rear group II according to the first aspect includes a positive sixth lens 6 as the plastic lens closer to the image side than the fifth lens 5.

The front group I including a plurality of the negative lenses at the object side, changes the large field angle of the incident light beam from the object side into a small angle so as to realize the target projection mode. The negative first lens 1 that is the closest to the object side has to be formed as a meniscus lens for covering the incident light beam at the super-wide angle from the object side, and suppressing the surplus aberration. If the field angle is larger than 90°, it is difficult to provide the cover at the object side. So preferably, the first lens 1 is formed of the glass material for maintaining durability of the optical device.

Preferably, the second lens 2 is an aspherical lens so as to realize the target projection mode and to provide the front group I as the concave lens group a certain degree of freedom for correcting the specific aberration. The plastic material is used to lower costs. The second lens 2 is configured such that the image side has a stronger curvature than that of the object side for correcting the aberration. The strong curvature herein represents the large curvature (small curvature radius).

It is preferable to satisfy the following conditions for the front group I:

$$-2.40 < f1/f < -1.55 \qquad (C1)$$

$$0.15 < f2/f1 < 0.35 \qquad (C2)$$

where f1 denotes a focal distance of the first lens 1, f2 denotes a focal distance of the second lens 2, fI denotes a composite focal distance thereof, that is, the front group I and f denotes a focal distance of the whole system of the front group I and the rear group II.

The above conditions (C1) and (C2) are necessary to realize the wide field angle and the projection mode at the small compression rate while reducing the effect caused by the temperature change and maintaining good aberration.

Condition (C2) is used to determine the ratio of the focal distance between the first lens 1 and the second lens 2. If it is smaller than the lower limit of condition (C2), the power (magnification) of the plastic second lens 2 becomes relatively strong. This may increase the focal shift of the front group I due to the temperature change, thus making it difficult for the rear group II to perform the temperature compensation. If it is equal to or larger than the upper limit of condition (C2), the power of the first lens 1 becomes relatively strong, similar to the example disclosed in Japanese Unexamined Patent Application Publication No. 2005-221920, and the curvature at the image side of the negative lens 1 as the meniscus lens becomes strong. The resultant lens is difficult to process and becomes expensive. As the power of the second lens 2 formed of plastic becomes relatively weak, the focal shift of the front group I due to the temperature change is reduced. This may require the focal shift of the rear group II to be reduced, thus limiting the number of the plastic lenses to be used for the rear group II.

The condition (C1) is used for determining the ratio of the focal distance of the whole system to that of the front group I, as well as determining the magnification βII of the rear group II. If it is equal to or lower than the lower limit of the condition (C1), the power of the front group I becomes relatively weak, and it is difficult to widen the angle, similar to the example disclosed in Japanese Unexamined Patent Application Publication No. 2003-232998. If it is equal to or higher than the upper limit of the condition (C1), the power of the front group I becomes relatively too strong (magnification βII of the rear group II becomes high) similar the example disclosed in Japanese Unexamined Patent Application Publication No. 2005-221920. This may be disadvantageous to correct the aberration. The power of the second lens 2 as the plastic lens also becomes strong to increase the focal shift of the front group I due to the temperature change. The focal shift may further be expanded by the rear group II with the high magnification. It is, thus, difficult to keep the balance between the aberration correction and the temperature compensation in the entire system.

In the above-structured lens system, the following condition has to be satisfied to effectively realize the temperature compensation:

$$\Delta I \times \alpha + \Delta II < \Delta F \tag{C9}$$

Where ΔI denotes the focal shift of the front group I owing to the temperature, α denotes the longitudinal magnification of the rear group II (βII×βII), ΔII denotes the focal shift of the rear group II, and DF denotes the focal depth defined by the usable wavelength and Fno.

The above conditions (C1), (C2) and (C9) are essential for realizing the half field angle in excess of 90° while satisfying the condition for the temperature compensation and suppressing the focal shift of the whole system using the second lens 2 as the plastic lens within an allowable range.

The plastic lens may be preferentially used for the rear group II by satisfying the above conditions (C1), (C2) and (C9). For example, it is possible to form the third lens 3 as the plastic lens, and the fourth lens 4 and the fifth lens 5 that form the composite lens as the plastic lens. Alternatively, the sixth lens 6 as the plastic lens may be added as shown in FIG. 1. It is possible to make the rear group II by using the glass lenses only. However, it is difficult to form the rear group II by using the plastic lenses only in view of the temperature compensation.

Referring to FIG. 1, in the case where the sixth lens 6 as the plastic lens is added to the image side of the rear group II, it is preferable to satisfy the following condition to perform the temperature compensation in the whole system successfully:

$$4 < f6/f \tag{C7}$$

If it is equal to or lower than the lower limit of the condition (C7), the temperature change caused by the sixth lens 6 added to the rear group II becomes excessive, resulting in difficulty in the temperature compensation relative to the front group I. Assuming that the sixth lens 6 as the plastic lens is used, it is possible to form all the rest of the lenses of the rear group II as the glass lenses. Alternatively, it is also possible to form the sixth lens 6 and the third lens 3 as the plastic lenses while forming the other lenses of the rear group II as the glass lenses, or to form the sixth lens 6 and both the fourth lens 4 and the fifth lens 5 as the plastic lenses while forming the other lenses of the rear group II as the glass lenses.

Correction of chromatic aberration will be described hereinafter. The chromatic aberration that occurs in the front group I is basically corrected by the biconvex third lens 3 that is the closest to the object side of the rear group II. Accordingly, it is necessary to use the material with small abbe number for forming the third lens 3.

The third lens 3 may be classified as the front group I in view of the color correction. However, the negative lens group is defined as the front group I and the third lens 3 is contained in the rear group II herein in order to clarify the condition for the power of the front group I including the negative lens group. The chromatic aberration that occurs in the lens closer to the image side than the aperture stop S in the rear group II is basically corrected by the negative fourth lens 4 that is the closest to the aperture stop S. Accordingly, the fourth lens 4 is also required to be formed of the material with small abbe number as well.

Moreover, the average value va of the abbe numbers of the third lens 3 and the fourth lens 4 is required to satisfy the following condition in order to correct the chromatic aberration in the whole system:

$$Va < 29 \tag{C3}$$

Due to reasons contrary to the above, an average value of abbe numbers of the first lens 1 and the second lens 2 of the front group I, and the positive lenses contained in the rear group II, that is, the average value vb of abbe numbers of all the lenses except the third lens 3 and the fourth lens 4, is required to satisfy the following condition:

$$Vb > 50 \tag{C4}$$

If it is equal to or higher than each limit of the conditions (C3) and (C4), the residual amount of the correction of chromatic aberration between the front and the rear groups I and II becomes large. This makes it difficult to correct the chromatic aberration in the whole system.

The following condition is established:

$$-3.4 < f3/f1 < -1.4 \tag{C5}$$

where f3 denotes a focal distance of the third lens 3.

In the case where the sixth lens 6 as the plastic lens is used in the rear group II, it is preferable to satisfy the following condition:

$$-1.2 < f4/fII < -0.5 \tag{C8}$$

where f4 denotes the focal distance of the fourth lens, and fII denotes the focal distance of the rear group II.

In the optical device according to the second aspect, as shown in FIG. 3, using the structure of the optical device according to the first aspect as shown in FIG. 1, the sixth lens 6 is not used. In the case where the sixth lens 6 is not used, and preferably, the following condition is satisfied:

$$-1.6 < f4/fII < -1.1 \tag{C6}$$

Preferably, the rear group II contains the aspherical lens in consideration of correcting the aberration. It is preferable to use the plastic lens in view of the cost. It is possible to use the plastic lens preferentially for the rear group II based on the various arrangements. By forming the plastic lens usable for the rear group into the aspherical lens, it is possible to realize the certain degree of freedom for the required optical characteristics. Preferably, the lens that is closer to the image side than the aperture stop S is formed as the aspherical lens. Further, it is advantageous to contain the aspherical lens at the position that is the closest to the image side.

Embodiments

Embodiments of the present invention will be described. In the embodiments as described below, the optical surface of at least one lens is made aspherical. The formula for the aspherical surface is expressed in the formula 1. However, the present invention is not limited to the aspherical surface as expressed by the formula 1.

$$z = \frac{ch^2}{1+\sqrt{1-(1+k)c^2h^2}} + A_4h^4 + A_6h^6 + A_8h^8 + \ldots + A_{26}h^{26} \quad \text{formula 1}$$

where z denotes a surface depth along the optical axis from the reference plane in contact with the top end of the aspherical surface, c denotes an inverse of the curvature radius R of the optical surface, h denotes the height of the plane from the optical axis, k denotes a cone constant indicating the quadratic surface, and $A_4$ to $A_{26}$ denotes the aspherical surface correction coefficient.

Referring to Table 7, in all the embodiments, the horizontal interfacial angle is set to 190° (half field angle is set to 95°).

The respective codes shown in FIGS. 1 and 3, and in Tables 1 to 7 are defined as follows.

R1, R2 (mm) . . . curvature radius of each lens surface;

D1, D2 (mm) . . . thickness of each lens surface on the optical axis, spacing between lenses on the optical axis, spacing between the lens and the aperture stop S on the optical axis, or spacing between the lens and the cover glass 7 on the optical axis, the spacing between the cover glass and the image pickup element 8.

N1, N2 . . . relative refractive index between each lens and the cover glass 7.

v1, v2 . . . abbe number of each lens and the cover glass 7, respectively.

H1 (mm) . . . maximum height in the direction orthogonal to the optical axis O1-O2 of the optical device.

Overall length (mm) . . . overall length in the direction of the optical axis O1-O2 of the optical device.

Table 1 shows structures of the first to the third embodiments. The structures of the first and the third embodiments are the same as that of the first aspect where the sixth lens 6 is added as shown in FIG. 1. In the structure of the second embodiment the sixth lens is not used, which is similar to the aspect shown in FIG. 3.

In the first embodiment, the second lens 2 and the sixth lens 6 are the plastic lenses. In the second embodiment, the second lens 2, the fourth lens 4 and the fifth lens 5 are the plastic lenses. In the third embodiment, the second lens 2, the fourth lens 4, the fifth lens 5 and the sixth lens 6 are the plastic lenses, respectively. The other lenses are the glass lenses.

The respective conditions for the first to the third and other embodiments are listed in Table 7.

Figure 2A:
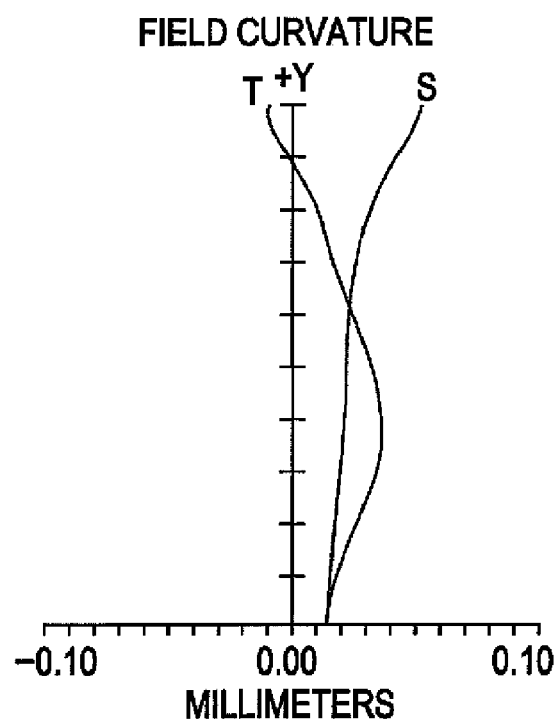
FIGS. 2A and 2B show aberration graphs of the astigmatism and distortion.
Figure 2B:
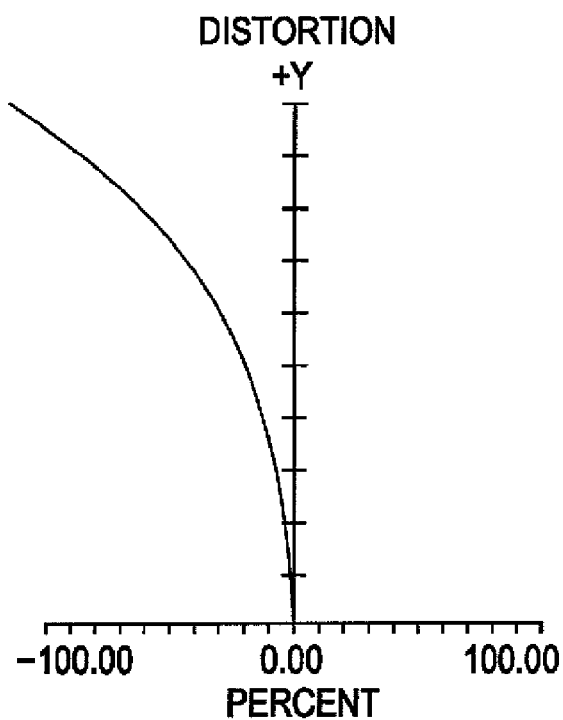

FIG. 2A is a curve graph of astigmatism in the first embodiment. FIG. 2B is a curve graph of distortion aberration in the first embodiment FIG. 4A is a curve graph of astigmatism in the second embodiment. FIG. 4B is a curve graph of distortion aberration in the second embodiment. FIG. 5A is a curve graph of astigmatism in the third embodiment. FIG. 5B is a curve graph of distortion aberration in the third embodiment.

TABLE 1

| | CURVATUER RADIUS | | SPACING | | REFRACTIVE INDEX | | Abbe NUMBER |
|---|---|---|---|---|---|---|---|
| | 1ST EMBODIMENT | | | | | | |
| R1 | 14.438 | D1 | 0.800 | N1 | 1.6968 | V1 | 55.5 |
| R2 | 4.108 | D2 | 2.203 | N2 | | V2 | |
| R3 | -110.828 | D3 | 0.600 | N3 | 1.5120 | V3 | 56.3 |
| R4 | 1.357 | D4 | 1.664 | N4 | | V4 | |
| R5 | 27.047 | D5 | 3.710 | N5 | 1.9229 | V5 | 18.9 |
| R6 | -5.616 | D6 | 1.050 | N6 | | V6 | |
| R7 | 0.000 | D7 | 0.416 | N7 | | V7 | |
| R8 | 8.214 | D8 | 0.600 | N8 | 1.9229 | V8 | 18.9 |
| R9 | 2.000 | D9 | 2.000 | N9 | 1.5891 | V9 | 61.1 |
| R10 | -2.646 | D10 | 0.100 | N10 | | V10 | |
| R11 | -34.064 | D11 | 1.239 | N11 | 1.5120 | V11 | 56.3 |
| R12 | -2.271 | D12 | 0.700 | N12 | | V12 | |
| R13 | 0.000 | D13 | 0.750 | N13 | 1.5168 | V13 | 64.2 |
| R14 | 0.000 | D14 | 1.170 | N14 | | V14 | |
| | 2ND EMBODIMENT | | | | | | |
| R1 | 18.087 | D1 | 0.700 | N1 | 1.4875 | V1 | 70.2 |
| R2 | 3.448 | D2 | 1.784 | N2 | | V2 | |
| R3 | -8.187 | D3 | 0.600 | N3 | 1.5251 | V3 | 56.3 |
| R4 | 1.814 | D4 | 0.956 | N4 | | V4 | |
| R5 | 19.025 | D5 | 2.222 | N5 | 1.8467 | V5 | 23.8 |
| R6 | -4.733 | D6 | 0.956 | N6 | | V6 | |
| R7 | 0.000 | D7 | 0.702 | N7 | | V7 | |
| R8 | 3.075 | D8 | 0.600 | N8 | 1.6073 | V8 | 26.6 |
| R9 | 1.325 | D9 | 1.745 | N9 | 1.5251 | V9 | 56.3 |
| R10 | -1.557 | D12 | 1.236 | N10 | | V10 | |
| R13 | 0.000 | D13 | 0.500 | N13 | 1.5168 | V13 | 64.2 |
| R14 | 0.000 | D14 | 0.500 | N14 | | V14 | |
| | 3RD EMBODIMENT | | | | | | |
| R1 | 15.455 | D1 | 0.700 | N1 | 1.4875 | V1 | 70.2 |
| R2 | 3.657 | D2 | 2.259 | N2 | | V2 | |
| R3 | -58.385 | D3 | 0.600 | N3 | 1.5251 | V3 | 56.3 |
| R4 | 1.249 | D4 | 1.443 | N4 | | V4 | |
| R5 | 10.200 | D5 | 3.600 | N5 | 1.8467 | V5 | 23.8 |
| R6 | -3.856 | D6 | 0.551 | N6 | | V6 | |
| R7 | 0.000 | D7 | 0.149 | N7 | | V7 | |
| R8 | -11.422 | D8 | 0.600 | N8 | 1.6073 | V8 | 26.8 |
| R9 | 1.183 | D9 | 1.300 | N9 | 1.5261 | V9 | 56.3 |
| R10 | -2.467 | D10 | 0.100 | N10 | | V10 | |
| R11 | -264.316 | D11 | 0.913 | N11 | 1.5251 | V11 | 56.3 |
| R12 | -1.904 | D12 | 0.500 | N12 | | V12 | |
| R13 | 0.000 | D13 | 0.750 | N13 | 1.5168 | V13 | 64.2 |
| R14 | 0.000 | D14 | 1.170 | N14 | | V14 | |

Table 2 is a list showing the respective aspherical coefficients of the optical surfaces in the first to the third embodiments. The lens with the aspherical optical surface is the plastic lens. The optical surface having no aspherical coefficient shown in Table 2 is spherical. All the optical surfaces of the glass lenses are spherical.

TABLE 2

| PLANE NO. | CONE CONSTANT | A4 | A6 | A8 | A10 |
|---|---|---|---|---|---|
| | | 1ST EMBODIMENT | | | |
| R1 | | | | | |
| R2 | | | | | |
| R3 | | 1.7970E−03 | −2.1895E−04 | 1.2458E−05 | −3.4812E−07 |
| R4 | −0.7661 | 1.2035E−02 | −7.3634E−03 | 2.4357E−03 | −2.8244E−04 |
| R5 | | | | | |
| R6 | | | | | |
| R7 | | | | | |
| R8 | | | | | |
| R9 | | | | | |
| R10 | | | | | |
| R11 | −181.7551 | −4.1312E−02 | 1.1540E−02 | −7.3281E−03 | 1.3562E−03 |
| R12 | −1.3566 | −2.7315E−02 | 6.6072E−03 | −2.9388E−03 | 3.2072E−04 |
| R13 | | | | | |
| R14 | | | | | |
| | | 2ND EMBODIMENT | | | |
| R1 | | | | | |
| R2 | | | | | |
| R3 | | 4.4421E−03 | 2.9919E−04 | −6.4774E−05 | 2.9076E−06 |
| R4 | −0.8198 | 2.9354E−02 | −1.1872E−02 | 7.7319E−03 | −7.1506E−04 |
| R6 | | | | | |
| R7 | | | | | |
| R8 | −24.5758 | 5.2997E−02 | −1.1346E−02 | 9.2570E−03 | |
| R9 | | | | | |
| R10 | 0.0718 | 4.1918E−02 | 1.5883E−02 | −5.7117E−03 | 4.7202E−03 |
| R13 | | | | | |
| R14 | | | | | |
| | | 3RD EMBODIMENT | | | |
| R1 | | | | | |
| R2 | | | | | |
| R3 | | 6.7564E−05 | −2.5520E−06 | −3.3696E−07 | −1.7157E−08 |
| R4 | −0.6257 | −4.3919E−03 | −5.3187E−03 | 4.4949E−04 | −8.9845E−06 |
| R5 | | | | | |
| R6 | | | | | |
| R7 | | | | | |
| R8 | | −2.5209E−02 | −9.2397E−02 | −1.6032E−01 | 8.0009E−01 |
| R9 | | | | | |
| R10 | 2.9967 | 2.1166E−02 | −3.7619E−02 | 9.9244E−03 | 1.8729E−03 |
| R11 | 0.0000 | −9.2183E−03 | 8.6341E−03 | 1.0132E−03 | 7.4209E−04 |
| R12 | −1.0540 | 6.1513E−03 | 2.0832E−02 | 2.1897E−03 | 5.7211E−04 |
| R13 | | | | | |
| R14 | | | | | |

Table 3 shows parameters for structures of the fourth to the sixth embodiments. The fifth embodiment has the same structure as that of the first aspect where the sixth lens 6 is added, as shown in FIG. 1. In the fourth and the sixth embodiments, the sixth lens is not used likewise the aspect shown in FIG. 3.

In the fourth embodiment, the second lens 2 and the third lens 3 are the plastic lenses. In the fifth embodiment, the second lens 2, the third lens 3 and the sixth lens 6 are the plastic lenses. In the sixth embodiment, the second lens 2 is the plastic lens. The other lenses are the glass lenses.

Figure 6A:
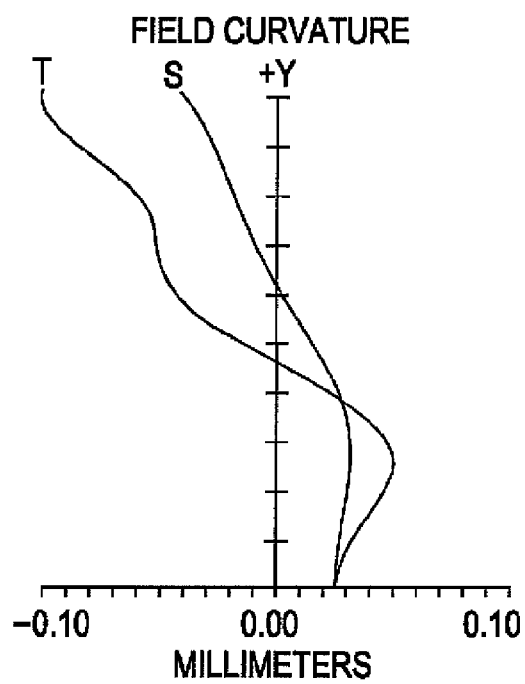
FIGS. 6A and 6B show aberration graphs of the astigmatism and distortion according to the fourth embodiment.
Figure 6B:
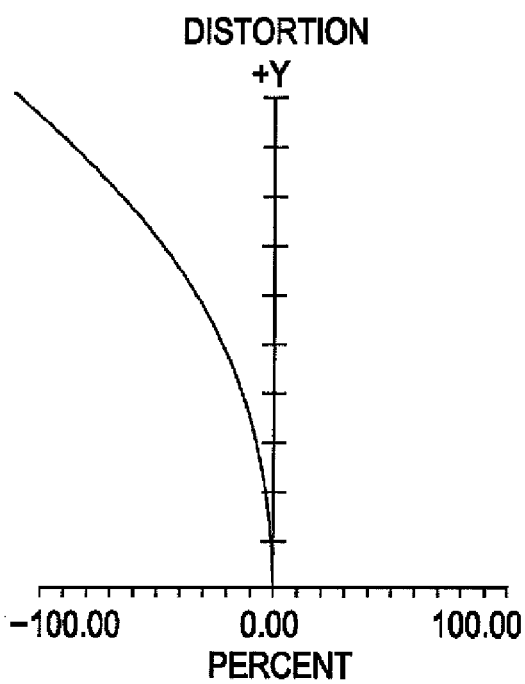
Figure 7A:
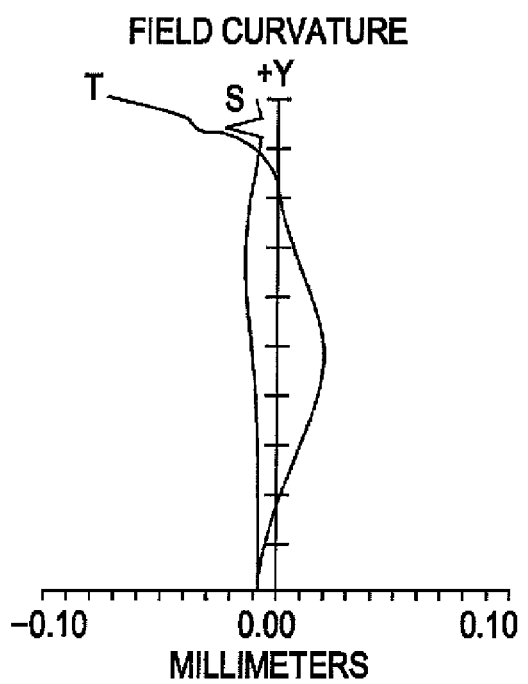
FIGS. 7A and 7B show aberration graphs of the astigmatism and distortion according to the fifth embodiment.
Figure 7B:
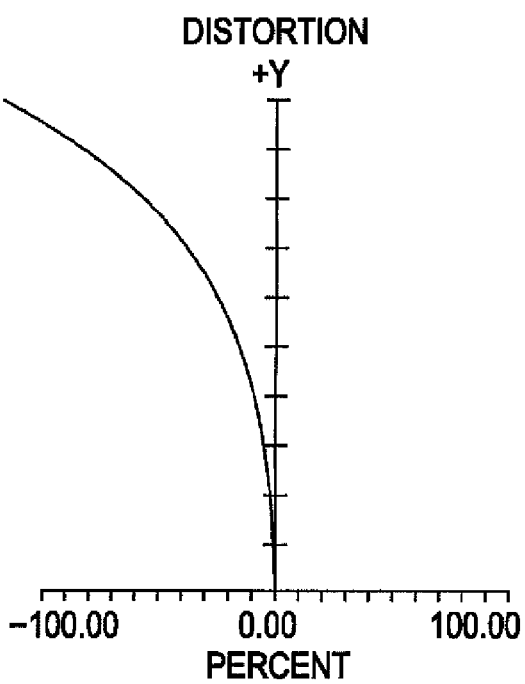
Figure 8A:
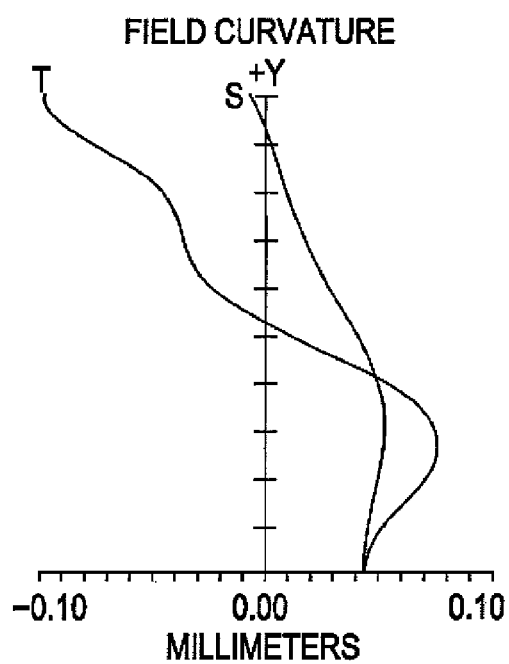
FIGS. 8A and 8B show aberration graphs of the astigmatism and distortion according to the sixth embodiment.
Figure 8B:
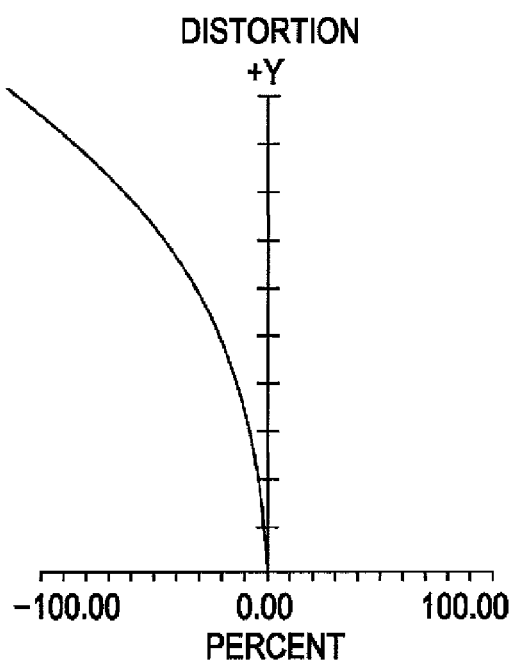

FIG. 6A is a curve graph of astigmatism in the fourth embodiment. FIG. 6B is a curve graph of distortion aberration in the fourth embodiment. FIG. 7A is a curve graph of astigmatism in the fifth embodiment. FIG. 7B is a curve graph of distortion aberration in the fifth embodiment. FIG. 8A is a curve graph of astigmatism in the sixth embodiment, FIG. 8B is a curve graph of distortion aberration in the sixth embodiment.

TABLE 3

| | CURVATUER RADIUS | | SPACING | | REFRACTIVE INDEX | | Abbe NUMBER |
|---|---|---|---|---|---|---|---|
| | | | 4TH EMBODIMENT | | | | |
| R1 | 15.065 | D1 | 0.700 | N1 | 1.4875 | V1 | 70.2 |
| R2 | 3.346 | D2 | 1.518 | N2 | | V2 | |
| R3 | −110.977 | D3 | 0.600 | N3 | 1.5251 | V3 | 56.3 |
| R4 | 1.419 | D4 | 2.040 | N4 | | V4 | |
| R5 | 11.446 | D5 | 0.744 | N5 | 1.6073 | V5 | 26.6 |
| R6 | −3.135 | D6 | 0.100 | N6 | | V6 | |
| R7 | 0.000 | D7 | 0.993 | N7 | | V7 | |
| R8 | 5.635 | D8 | 0.600 | N8 | 1.9229 | V8 | 18.9 |
| R9 | 1.777 | D9 | 1.472 | N9 | 1.8935 | V9 | 53.2 |
| R10 | −1.956 | D12 | 0.647 | N10 | | V10 | |
| R13 | 0.000 | D13 | 0.350 | N13 | 1.5168 | V13 | 64.2 |
| R14 | 0.000 | D14 | 1.170 | N14 | | V14 | |
| | | | 5TH EMBODIMENT | | | | |
| R1 | 21.359 | D1 | 1.000 | N1 | 1.4875 | V1 | 70.2 |
| R2 | 4.612 | D2 | 2.831 | N2 | | V2 | |
| R3 | 28.707 | D3 | 0.600 | N3 | 1.5251 | V3 | 56.3 |
| R4 | 1.344 | D4 | 2.186 | N4 | | V4 | |
| R5 | 7.073 | D5 | 1.322 | N5 | 1.6073 | V5 | 26.6 |
| R6 | −4.081 | D6 | 0.161 | N6 | | V6 | |

TABLE 3-continued

| | CURVATUER RADIUS | | SPACING | | REFRACTIVE INDEX | | Abbe NUMBER |
|---|---|---|---|---|---|---|---|
| R7 | 0.000 | D7 | 0.700 | N7 | | V7 | |
| R8 | 1102.412 | D8 | 0.600 | N8 | 1.9229 | V8 | 18.9 |
| R9 | 2.236 | D9 | 1.385 | N9 | 1.6968 | V9 | 55.5 |
| R10 | −2.038 | D10 | 0.100 | N10 | | V10 | |
| R11 | 6.465 | D11 | 0.924 | N11 | 1.5251 | V11 | 56.3 |
| R12 | −3.627 | D12 | 0.300 | N12 | | V12 | |
| R13 | 0.000 | D13 | 0.500 | N13 | 1.5168 | V13 | 64.2 |
| R14 | 0.000 | D14 | 1.030 | N14 | | V14 | |
| | | | 6TH EMBODIMENT | | | | |
| R1 | 14.096 | D1 | 0.700 | N1 | 1.4875 | V1 | 70.2 |
| R2 | 3.848 | D2 | 1.604 | N2 | | V2 | |
| R3 | −58.542 | D3 | 0.600 | N3 | 1.5251 | V3 | 58.3 |
| R4 | 1.387 | D4 | 1.684 | N4 | | V4 | |
| R5 | 23.361 | D5 | 0.951 | N5 | 1.8081 | V5 | 22.8 |

TABLE 3-continued

| | CURVATUER RADIUS | | SPACING | | REFRACTIVE INDEX | | Abbe NUMBER |
|---|---|---|---|---|---|---|---|
| R6 | −3.432 | D6 | 0.099 | N6 | | V6 | |
| R7 | 0.000 | D7 | 0.797 | N7 | | V7 | |
| R8 | 7.882 | D8 | 0.600 | N8 | 1.8229 | V8 | 18.9 |
| R9 | 1.859 | D9 | 1.482 | N9 | 1.6958 | V9 | 55.5 |
| R10 | −1.657 | D12 | 1.316 | N10 | | V10 | |
| R13 | 0.000 | D13 | 0.500 | N13 | 1.5168 | V13 | 64.2 |
| R14 | 0.000 | D14 | 0.500 | N14 | | V14 | |

Table 4 shows the respective aspherical coefficients of the optical surfaces in the fourth to the sixth embodiments. In the sixth embodiment, the fifth lens is the glass lens having its optical surface R10 aspherical. The optical surface having no aspherical coefficient shown in Table 4 is spherical.

TABLE 4

| PLANE NO. | CONE CONSTANT | A4 | A6 | A8 | A10 |
|---|---|---|---|---|---|
| | | 4TH EMBODIMENT | | | |
| R1 | | | | | |
| R2 | | | | | |
| R3 | | 1.2697E−03 | 5.8981E−04 | −6.4938E−05 | |
| R4 | −0.1157 | 2.2649E−02 | −3.9554E−02 | 1.9793E−02 | |
| R5 | | | | | |
| R6 | 1.4727 | 1.1422E−02 | 2.6734E−02 | −7.3889E−02 | |
| R7 | | | | | |
| R8 | | | | | |
| R9 | | | | | |
| R10 | 0.3856 | 2.9754E−02 | 1.9277E−03 | 2.2077E−03 | −5.0664E−05 |
| R13 | | | | | |
| R14 | | | | | |
| | | 5TH EMBODIMENT | | | |
| R1 | | | | | |
| R2 | | | | | |
| R3 | 0.0000 | 7.0597E−04 | 6.1870E−05 | −9.1252E−06 | |
| R4 | −0.3518 | −2.4816E−02 | −3.9820E−03 | −6.1796E−04 | |
| R5 | 9.6488 | 7.1258E−05 | 2.4448E−02 | −2.0376E−03 | |
| R6 | 1.2753 | 4.7418E−02 | 1.2879E−02 | −1.3451E−02 | |
| R7 | | | | | |
| R8 | | | | | |
| R9 | | | | | |
| R10 | | | | | |
| R11 | −14.5417 | −1.6469E−02 | 1.1063E−02 | 1.3968E−04 | |
| R12 | 0.5904 | 1.3257E−02 | 8.3678E−03 | 2.0285E−03 | |
| R13 | | | | | |
| R14 | | | | | |
| | | 6TH EMBODIMENT | | | |
| R1 | | | | | |
| R2 | | | | | |
| R3 | | 1.8278E−03 | 5.8485E−04 | −6.5961E−05 | −3.4812E−07 |
| R4 | 0.0105 | 9.7751E−03 | −4.4686E−02 | 2.2536E−02 | −2.8244E−04 |
| R5 | | | | | |
| R6 | | | | | |
| R7 | | | | | |
| R8 | | | | | |
| R9 | | | | | |
| R10 | 0.0385 | 4.0898E−02 | −3.3627E−03 | 5.2384E−03 | |
| R13 | | | | | |
| R14 | | | | | |

Table 5 is a list showing parameters for structures of the seventh to the ninth embodiments. Among all the embodiments, the second lens 2 and the sixth lens 6 are the plastic lenses. The other lenses are the glass lenses. In the seventh to the ninth embodiments, the sixth lens 6 is used as shown in FIG. 1.

Figure 9A:
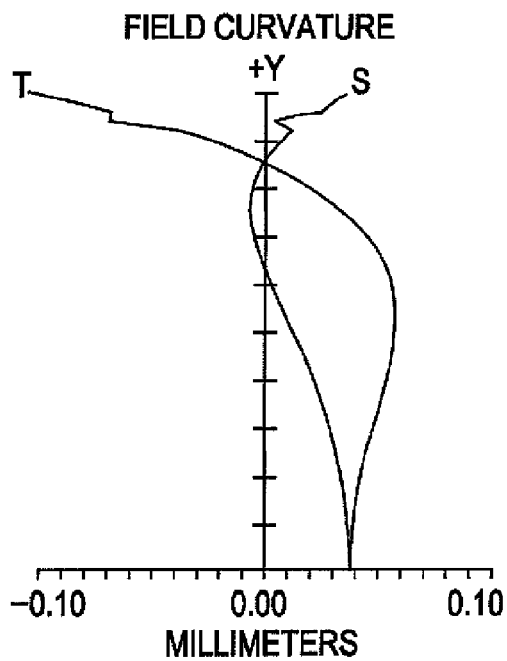
FIGS. 9A and 9B show aberration graphs of the astigmatism and distortion according to the seventh embodiment.
Figure 9B:
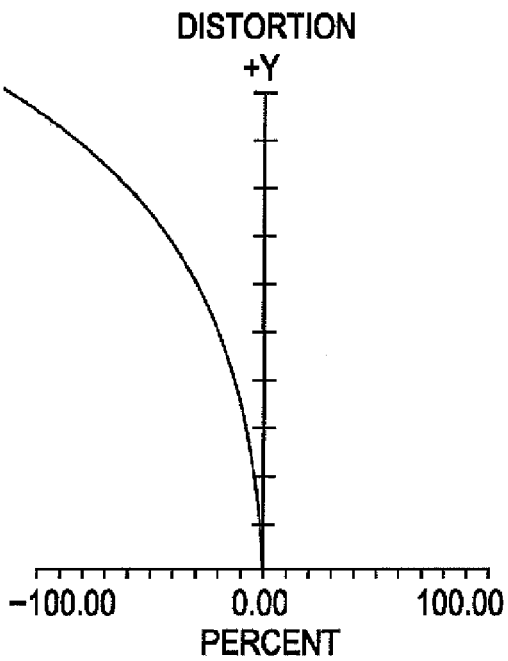
Figure 10A:
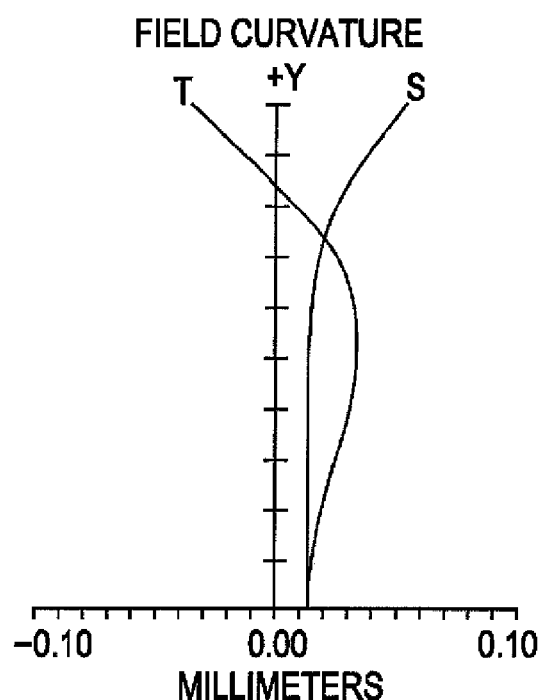
FIGS. 10A and 10B show aberration graphs of the astigmatism and distortion according to the eighth embodiment.
Figure 10B:
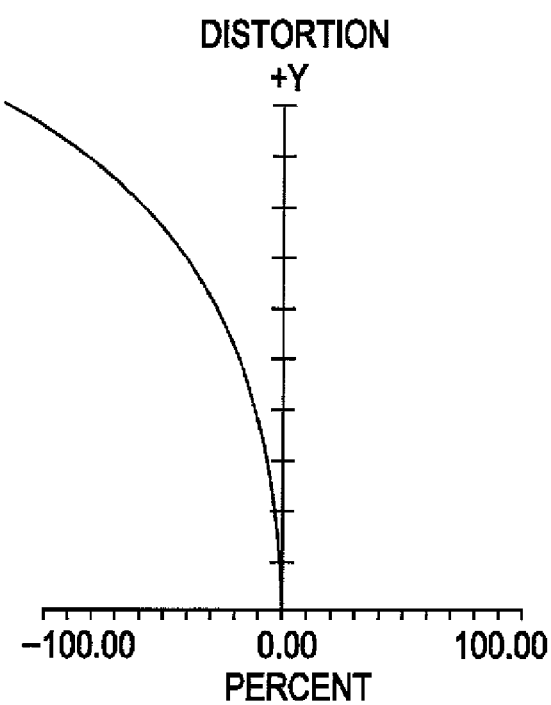
Figure 11A:
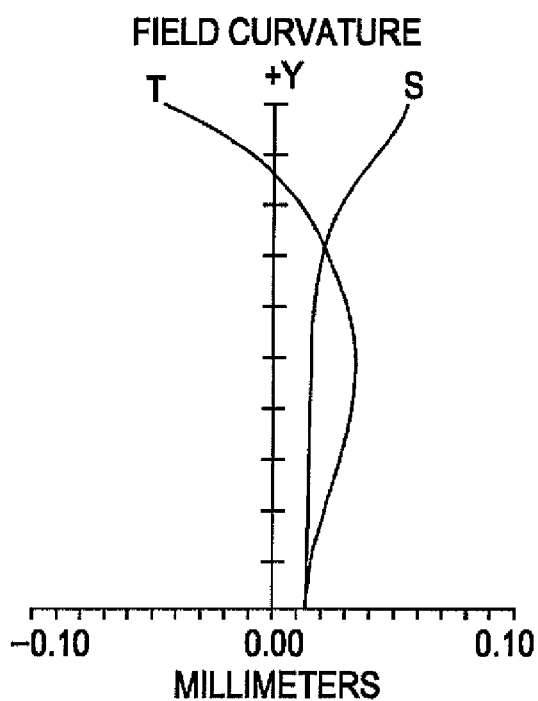
FIGS. 11A and 11B show aberration graphs of the astigmatism and distortion according to the ninth embodiment.
Figure 11B:
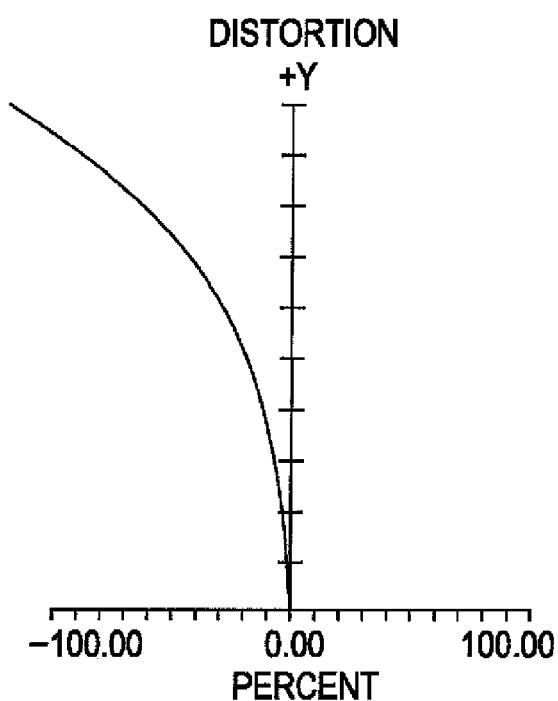
Figure 12:
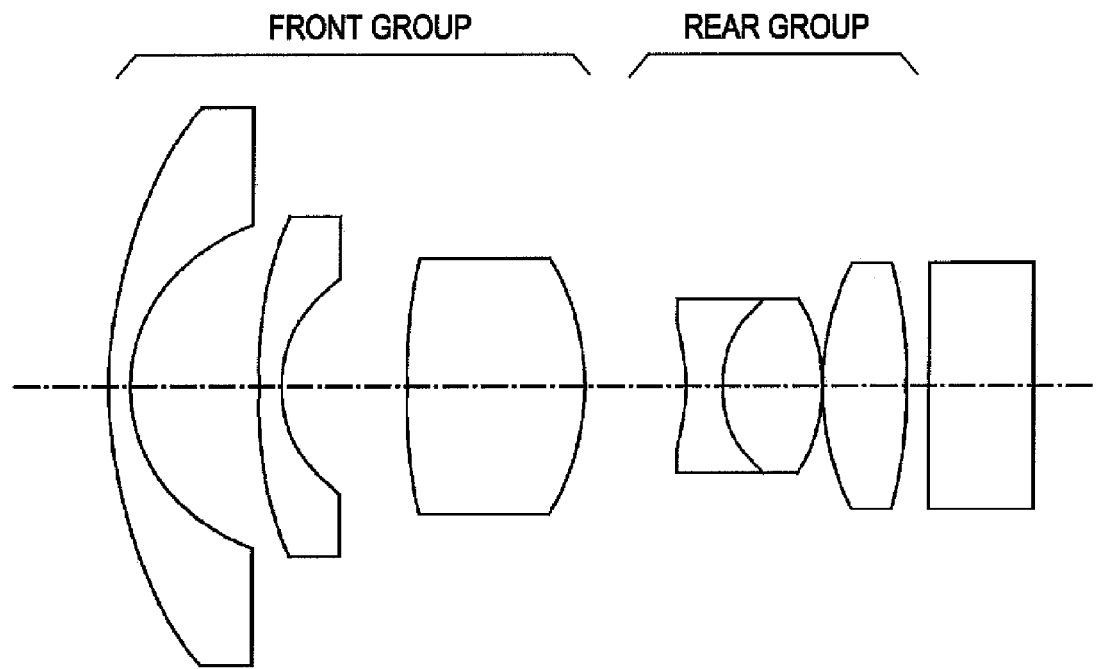
FIG. 12 is a sectional view of the related art.
Figure 13:
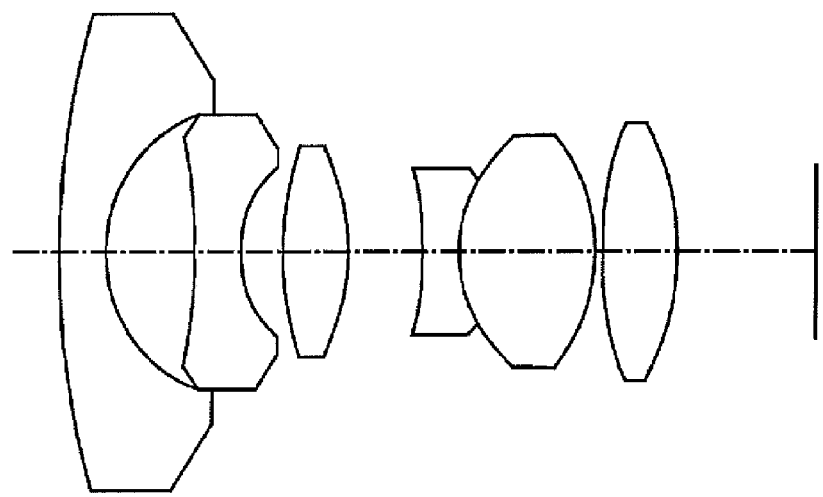
FIG. 13 is a sectional view of the related art.
Figure 14:
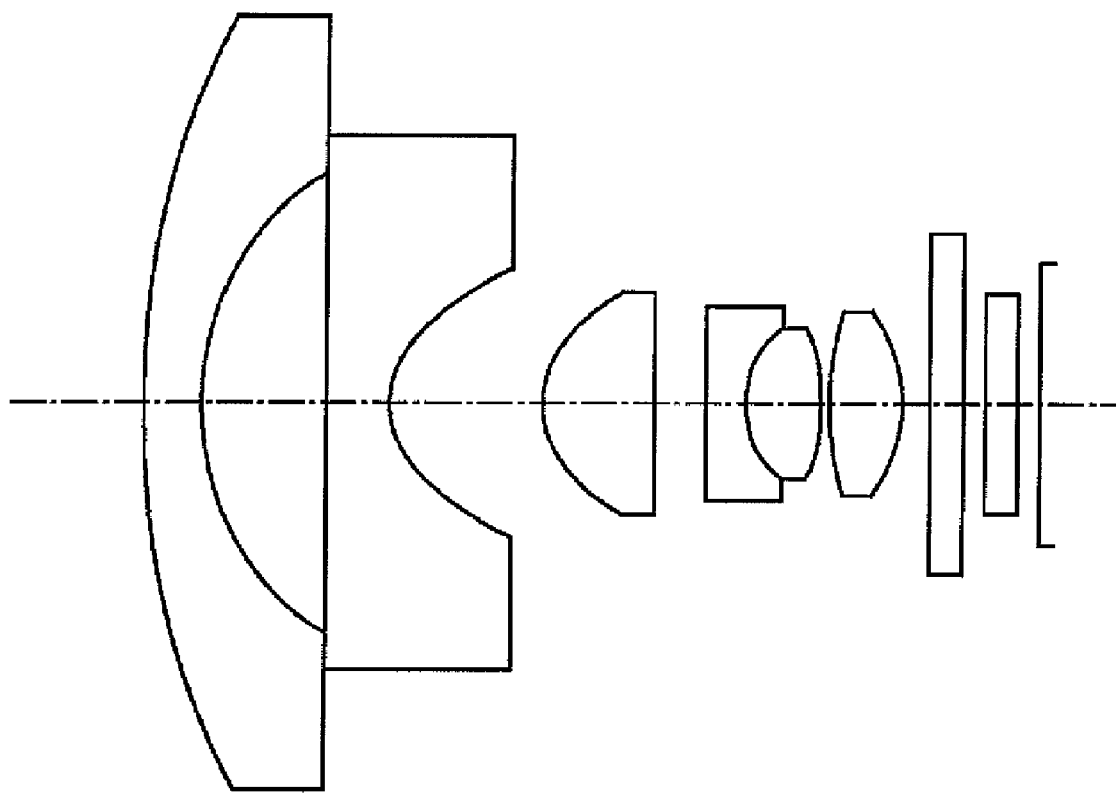
FIG. 14 is a sectional view of the related art.

FIG. 9A is a curve graph of astigmatism in the seventh embodiment. FIG. 9B is a curve graph of distortion aberration in the seventh embodiment. FIG. 10A is a curve graph of astigmatism in the eighth embodiment. FIG. 10B is a curve graph of distortion aberration in the eighth embodiment. FIG. 11A is a curve graph of astigmatism in the ninth embodiment. FIG. 11B is a curve graph of distortion aberration in the ninth embodiment

TABLE 5

| | CURVATUER RADIUS | | SPACING | | REFRACTIVE INDEX | | Abbe NUMBER |
|---|---|---|---|---|---|---|---|
| | | | 7TH EMBODIMENT | | | | |
| R1 | 13.578 | D1 | 0.700 | N1 | 1.4875 | V1 | 70.2 |
| R2 | 4.349 | D2 | 3.033 | N2 | | V2 | |
| R3 | 15.364 | D3 | 0.600 | N3 | 1.5251 | V3 | 56.3 |
| R4 | 1.183 | D4 | 1.193 | N4 | | V4 | |
| R5 | 5.544 | D5 | 0.741 | N5 | 1.8081 | V5 | 22.8 |
| R6 | −3.440 | D6 | 0.096 | N6 | | V6 | |
| R7 | 0.000 | D7 | 0.254 | N7 | | V7 | |
| R8 | −6.217 | D8 | 0.600 | N8 | 1.9229 | V8 | 18.9 |
| R9 | 1.972 | D9 | 1.242 | N9 | 1.6968 | V9 | 55.5 |
| R10 | −1.575 | D10 | 0.100 | N10 | | V10 | |
| R11 | 3.476 | D11 | 1.007 | N11 | 1.5251 | V11 | 56.3 |
| R12 | −3.529 | D12 | 0.400 | N12 | | V12 | |
| R13 | 0.000 | D13 | 0.500 | N13 | 1.5168 | V13 | 64.2 |
| R14 | 0.000 | D14 | 0.500 | N14 | | V14 | |
| | | | 8TH EMBODIMENT | | | | |
| R1 | 14.629 | D1 | 0.800 | N1 | 1.5891 | V1 | 61.1 |
| R2 | 4.191 | D2 | 2.315 | N2 | | V2 | |
| R3 | −264.708 | D3 | 0.600 | N3 | 1.6251 | V3 | 56.3 |
| R4 | 1.255 | D4 | 1.459 | N4 | | V4 | |
| R5 | 13.471 | D5 | 3.800 | N5 | 1.9229 | V5 | 18.9 |
| R6 | −5.437 | D6 | 0.605 | N6 | | V6 | |
| R7 | 0.000 | D7 | 0.432 | N7 | | V7 | |
| R8 | 17.391 | D8 | 0.600 | N8 | 1.9229 | V8 | 18.9 |
| R9 | 2.115 | D9 | 1.800 | N9 | 1.5891 | V9 | 61.1 |
| R10 | −2.996 | D10 | 0.100 | N10 | | V10 | |
| R11 | 10.238 | D11 | 1.513 | N11 | 1.5251 | V11 | 56.3 |
| R12 | −2.069 | D12 | 0.500 | N12 | | V12 | |
| R13 | 0.000 | D13 | 0.750 | N13 | 1.5168 | V13 | 64.2 |
| R14 | 0.000 | D14 | 1.170 | N14 | | V14 | |
| | | | 9TH EMBODIMENT | | | | |
| R1 | 15.189 | D1 | 0.800 | N1 | 1.4875 | V1 | 70.2 |
| R2 | 3.908 | D2 | 2.252 | N2 | | V2 | |
| R3 | −367.243 | D3 | 0.600 | N3 | 1.5251 | V3 | 56.3 |
| R4 | 1.234 | D4 | 1.545 | N4 | | V4 | |
| R5 | 16.037 | D5 | 3.600 | N5 | 1.9229 | V5 | 18.9 |
| R6 | −6.093 | D6 | 0.515 | N6 | | V6 | |
| R7 | 0.000 | D7 | 0.603 | N7 | | V7 | |
| R8 | 9.280 | D8 | 0.600 | N8 | 1.9229 | V8 | 18.9 |
| R9 | 2.073 | D9 | 1.379 | N9 | 1.5891 | V9 | 61.1 |
| R10 | −3.071 | D10 | 0.100 | N10 | | V10 | |
| R11 | 18.152 | D11 | 1.412 | N11 | 1.5251 | V11 | 56.3 |
| R12 | −1.942 | D12 | 0.500 | N12 | | V12 | |
| R13 | 0.000 | D13 | 0.750 | N13 | 1.5168 | V13 | 64.2 |
| R14 | 0.000 | D14 | 1.170 | N14 | | V14 | |

Table 6 is a list showing the respective aspherical coefficients corresponding to the seventh to the ninth embodiments. In the seventh to the ninth embodiments, each of the second lens 2 and the sixth lens 6 as the plastic lens is aspherical. The other glass lenses are spherical (the optical surface having no aspherical coefficient shown in Table 6 is spherical).

TABLE 6

| PLANE NO. | CONE CONSTANT | A4 | A6 | A8 | A10 |
|---|---|---|---|---|---|
| | | 7TH EMBODIMENT | | | |
| R1 | | | | | |
| R2 | | | | | |
| R3 | | −2.4476E−05 | −5.1177E−05 | −1.9285E−05 | |
| R4 | −0.0763 | −7.3307E−03 | −1.5308E−02 | −2.0861E−02 | |
| R5 | | | | | |
| R6 | | | | | |
| R7 | | | | | |
| R8 | | | | | |
| R9 | | | | | |
| R10 | | | | | |
| R11 | −0.7331 | −4.4466E−03 | −1.5511E−04 | −1.8574E−04 | |
| R12 | | 3.3714E−02 | 3.7317E−03 | 4.2871E−05 | |
| R13 | | | | | |
| R14 | | | | | |
| | | 8TH EMBODIMENT | | | |
| R1 | | | | | |
| R2 | | | | | |
| R3 | | 1.2353E−04 | −7.2919E−06 | −3.9196E−07 | 5.5277E−09 |
| R4 | −0.7023 | −1.3724E−03 | −2.9110E−03 | 1.5893E−04 | −9.4482E−06 |
| R5 | | | | | |
| R6 | | | | | |
| R7 | | | | | |
| R8 | | | | | |
| R9 | | | | | |
| R10 | | | | | |

TABLE 6-continued

| PLANE NO. | CONE CONSTANT | A4 | A6 | A8 | A10 |
|---|---|---|---|---|---|
| R11 | 0.7905 | −2.6816E−02 | 4.0761E−03 | −1.4363E−03 | 2.2756E−04 |
| R12 | −0.9167 | −7.3983E−03 | 1.2128E−03 | −5.8714E−04 | 3.9004E−05 |
| R13 | | | | | |
| R14 | | | | | |
| | | 9TH EMBODIMENT | | | |
| R1 | | | | | |
| R2 | | | | | |
| R3 | | 1.6944E−04 | −4.4920E−06 | −4.3200E−07 | 1.4254E−08 |
| R4 | −0.6841 | −1.0487E−03 | −4.0414E−03 | 1.4466E−04 | 3.0582E−07 |
| R5 | | | | | |
| R6 | | | | | |
| R7 | | | | | |
| R8 | | | | | |
| R9 | | | | | |
| R10 | | | | | |
| R11 | | −3.1621E−02 | 5.2278E−03 | −1.3704E−03 | 2.6357E−04 |
| R12 | −0.8588 | −8.1871E−03 | 4.5225E−04 | −2.0992E−04 | −2.5986E−05 |
| R13 | | | | | |
| R14 | | | | | |

Table 7 is a list showing conditions in the respective embodiments. In the table, ΔI denotes the focal shift of the front group I owing to the temperature change and ΔII denotes the focal shift of the rear group II owing to the temperature change. Each formula using those ΔI and ΔII represents the amount of change in the focal point when the temperature changes from −30° C. to 80° C.

TABLE 7

| EMBODIMENT NO. | 1 | 2 | 3 | 4 | 5 | 6 | 7 | 8 | 9 |
|---|---|---|---|---|---|---|---|---|---|
| STRUCTURE | 5-GROUP, 6 LENSES | 4-GROUP, 5 LENSES | 5-GROUP, 6 LENSES | 4-GROUP, 5 LENSES | 5-GROUP, 6 LENSES | 4-GROUP, 5 LENSES | 5-GROUP, 6 LENSES | 5-GROUP, 6 LENSES | 5-GROUP, 6 LENSES |
| HORIZONTAL INTERFACIAL ANGLE | 190.00 | 190.00 | 190.00 | 190.00 | 190.00 | 190.00 | 190.00 | 190.00 | 190.00 |
| FOCAL DISTANCE f | 0.84 | 1.05 | 0.81 | 1.06 | 0.78 | 1.04 | 0.82 | 0.81 | 0.81 |
| Fno | 2.93 | 3.01 | 2.90 | 3.02 | 2.78 | 2.94 | 2.92 | 2.92 | 2.91 |
| f1 | −8.48 | −8.85 | −9.99 | −8.97 | −12.27 | −11.07 | −13.42 | −10.23 | −11.02 |
| f2 | −2.60 | −2.76 | −2.31 | −2.65 | −2.69 | −2.51 | −2.47 | −2.37 | −2.33 |
| f3 | 5.27 | 4.64 | 3.71 | 4.10 | 4.43 | 3.73 | 2.70 | 4.60 | 5.14 |
| f4 | −2.97 | −4.37 | −1.72 | −3.01 | −2.40 | −2.74 | −1.55 | −2.63 | −2.98 |
| f5 | 2.29 | 1.72 | 1.73 | 1.60 | 1.76 | 1.52 | 1.46 | 2.41 | 2.33 |
| f6 | 4.67 | 0.00 | 3.63 | 0.00 | 4.55 | 0.00 | 3.50 | 3.41 | 3.41 |
| fI | −1.64 | −1.80 | −1.57 | −1.78 | −1.83 | −1.80 | −1.73 | −1.60 | −1.62 |
| fII | 3.64 | 2.91 | 2.99 | 2.46 | 2.37 | 2.27 | 1.80 | 3.57 | 3.20 |
| OVERALL LENGTH | 17.00 | 12.50 | 14.63 | 11.33 | 13.64 | 10.83 | 10.97 | 16.44 | 15.83 |
| H1 | 6.06 | 5.07 | 6.21 | 4.91 | 7.53 | 5.07 | 7.07 | 6.36 | 6.57 |
| f2/f1 | 0.31 | 0.31 | 0.23 | 0.30 | 0.22 | 0.23 | 0.18 | 0.23 | 0.21 |
| fI/f | −1.96 | −1.71 | −1.93 | −1.67 | −2.35 | −1.74 | −2.11 | −1.97 | −2.00 |
| f6/f | 5.59 | | 4.48 | | 5.85 | | 4.25 | 4.19 | 4.20 |
| Va | 18.90 | 25.21 | 25.21 | 22.77 | 22.77 | 20.83 | 20.83 | 18.90 | 18.90 |
| Vb | 57.30 | 60.93 | 59.77 | 59.91 | 59.58 | 60.68 | 59.58 | 58.71 | 60.98 |
| f3/fI | −3.22 | −2.58 | −2.37 | −2.31 | −2.42 | −2.07 | −1.56 | −2.87 | −3.16 |
| f4/fII | −0.82 | −1.50 | −0.57 | −1.22 | −1.01 | −1.21 | −0.86 | −0.74 | −0.93 |
| MAGNIFICATION CF REAR LENS GROUP (βII) | −0.52 | −0.59 | −0.53 | −0.60 | −0.43 | −0.58 | −0.47 | −0.51 | −0.51 |

TABLE 7-continued

| EMBODIMENT NO. | 1 | 2 | 3 | 4 | 5 | 6 | 7 | 8 | 9 |
|---|---|---|---|---|---|---|---|---|---|
| FRONT Δ I | −60.98 | −50.73 | −41.99 | −53.39 | −56.40 | −46.57 | −50.31 | −52.91 | −53.71 |
| REAR Δ II | 26.70 | 55.80 | 40.78 | 46.72 | 41.09 | −3.06 | 13.11 | 34.42 | 32.70 |
| Δ I × α | −16.24 | −17.39 | −11.66 | −19.16 | −10.29 | −15.43 | −11.19 | −13.92 | −13.73 |
| Δ I × α + Δ II | 10.47 | 38.40 | 29.12 | 27.56 | 30.80 | −18.49 | 1.92 | 20.50 | 18.97 |

What is claimed is:

1. An optical device having a front group formed of a plurality of lenses and a rear group formed of a plurality of lenses, which are arranged from an object side, wherein:

the front group includes a negative first lens as a meniscus lens being convex at the object side, and a negative second lens having a stronger curvature at an image side than at the object side, which are arranged in order from the object side, and the first lens is a glass lens and the second lens is a plastic aspherical lens;

the rear group includes a positive biconvex third lens, an aperture stop, and a composite lens formed by combining a negative fourth lens with stronger curvature at the image side than at the object side, and a positive biconvex fifth lens in tight contact therewith; and satisfying the following conditions for (C1) and (C2):

$$-2.4 < f1/f < -1.55 \quad (C1)$$

$$0.15 < f2/f1 < 0.35 \quad (C2)$$

where f denotes a focal distance of a whole system, f1 denotes a focal distance of the first lens, f2 denotes a focal distance of the second lens and fI denotes a focal distance of the front group.

2. The optical device according to claim 1, wherein following conditions (C3) and (C4) are satisfied:

$$va < 29 \quad (C3)$$

$$vb > 50 \quad (C4)$$

where va denotes an average value of abbe numbers of the third lens and the fourth lens, and vb denotes an average value of abbe numbers of all the rest of the lenses.

3. The optical device according to claim 1, wherein at least one of the lenses of the rear group is a plastic aspherical lens.

4. The optical device according to claim 1, wherein a following condition (C5) is satisfied:

$$-3.4 < f3/fI < -1.4 \quad (C5)$$

where f3 denotes a focal distance of the third lens.

5. The optical device according to claim 1, wherein a following condition (C6) is satisfied:

$$-1.6 < f4/fII < -1.1 \quad (C6)$$

where f4 denotes a focal distance of the fourth lens, and fII denotes a focal distance of the rear group.

6. The optical device according to claim 1, wherein a positive sixth lens formed as a plastic aspherical lens is added to the image side of the fifth lens of the rear group, and a following condition (C7) is satisfied:

$$4 < f6/f \quad (C7)$$

where f6 denotes a focal distance of the sixth lens.

7. The optical device according to claim 6, wherein a following condition (C8) is satisfied:

$$-1.2 < f4/fII < -0.5 \quad (C8)$$

where f4 denotes a focal distance of the fourth lens and fII denotes a focal distance of the rear group.

* * * * *